(12) United States Patent
Liu et al.

(10) Patent No.: US 10,482,898 B2
(45) Date of Patent: Nov. 19, 2019

(54) SYSTEM FOR ROBOT TO ELIMINATE OWN SOUND SOURCE

(71) Applicant: YUTOU TECHNOLOGY (HANGZHOU) CO., LTD., Zhejiang (CN)

(72) Inventors: Xin Liu, Zhejiang (CN); Peng Gao, Zhejiang (CN); Jiaqi Shi, Zhejiang (CN); Lichun Fan, Zhejiang (CN)

(73) Assignee: YUTOU TECHNOLOGY (HANGZHOU) CO., LTD., Zhejiang (CN)

(*) Notice: Subject to any disclaimer, the term of this patent is extended or adjusted under 35 U.S.C. 154(b) by 110 days.

(21) Appl. No.: 15/739,320

(22) PCT Filed: Jun. 14, 2016

(86) PCT No.: PCT/CN2016/085760
§ 371 (c)(1),
(2) Date: Dec. 22, 2017

(87) PCT Pub. No.: WO2017/000774
PCT Pub. Date: Jan. 5, 2017

(65) Prior Publication Data
US 2019/0115042 A1  Apr. 18, 2019

(30) Foreign Application Priority Data

Jun. 30, 2015 (CN) .......................... 2015 1 0381657

(51) Int. Cl.
*G10L 15/20* (2006.01)
*G10L 21/0272* (2013.01)
(Continued)

(52) U.S. Cl.
CPC ........ *G10L 21/0272* (2013.01); *G10L 13/043* (2013.01); *G10L 15/08* (2013.01);
(Continued)

(58) Field of Classification Search
CPC ....... G10L 13/043; G10L 15/08; G10L 15/22; G10L 25/27; G10L 25/48;
(Continued)

(56) References Cited

U.S. PATENT DOCUMENTS

| 4,974,191 A | * | 11/1990 | Amirghodsi | .......... | G06F 17/277 |
| | | | | | 380/1 |
| 6,689,947 B2 | * | 2/2004 | Ludwig | .................... | G10H 1/00 |
| | | | | | 84/645 |

(Continued)

FOREIGN PATENT DOCUMENTS

| CN | 101510425 | 8/2009 |
| CN | 102141812 | 8/2011 |

(Continued)

OTHER PUBLICATIONS

Shen et al., (CN 102305925 A—translation from global dossier). (Year: 2011).*

(Continued)

*Primary Examiner* — Vijay B Chawan
(74) *Attorney, Agent, or Firm* — Andrew F. Young, Esq.; Lackenbach Siegel, LLP

(57) ABSTRACT

Provided is a system for a robot to eliminate its own sound source, comprising a sound pickup unit (1) used for acquiring a digital signal having mixed left and right sound channels and outputting same; a sound-card driver unit (2) used for mixing the received reference signal of the robot sound source and the digital signal having mixed left and right sound channels, to form a mixed voice signal, and outputting same; a signal separation unit (3) used for separating the mixed voice signal into a digital signal having mixed left and right sound channels and a reference signal, and determining whether the digital signal having the mixed (Continued)

left and right sound channels contains an interference signal, obtaining a playback signal volume, and outputting same.

7 Claims, 1 Drawing Sheet

(51) Int. Cl.
  *G10L 13/04* (2013.01)
  *G10L 15/08* (2006.01)
  *G10L 15/22* (2006.01)
  *G10L 25/84* (2013.01)
  *G06N 5/02* (2006.01)
  *G10L 25/48* (2013.01)

(52) U.S. Cl.
  CPC ............. *G10L 15/22* (2013.01); *G10L 25/84* (2013.01); *G06N 5/02* (2013.01); *G06N 5/022* (2013.01); *G10L 25/48* (2013.01)

(58) Field of Classification Search
  CPC ........ G10L 2015/088; G10L 2015/223; G06N 5/02; G06N 5/022; G06N 5/04
  USPC ........ 704/233, 226–228, 270, 275; 381/94.3, 381/107, 56
  See application file for complete search history.

(56) References Cited

U.S. PATENT DOCUMENTS

| | | | | |
|---|---|---|---|---|
| 8,468,244 | B2* | 6/2013 | Redlich | G06Q 10/06 709/225 |
| 8,781,926 | B2* | 7/2014 | Nathan | G06F 3/04847 705/30 |
| 8,977,584 | B2* | 3/2015 | Jerram | G06Q 30/02 706/46 |
| 9,736,028 | B2* | 8/2017 | Ansari | G06Q 30/04 |
| 2006/0106601 | A1 | 5/2006 | Kong et al. | |
| 2008/0312918 | A1 | 12/2008 | Kim | |
| 2010/0034397 | A1* | 2/2010 | Nakadai | B25J 5/00 381/58 |
| 2011/0208335 | A1* | 8/2011 | Nathan | G06F 3/04847 700/94 |
| 2016/0075015 | A1* | 3/2016 | Izhikevich | B25J 9/163 700/253 |

FOREIGN PATENT DOCUMENTS

| | | |
|---|---|---|
| CN | 102903360 | 1/2013 |
| CN | 103593048 | 2/2014 |

OTHER PUBLICATIONS

PCT/CN2016/085320, ISR and Written Opinion, dated Sep. 21, 2016, 7 pages—English, 6 pages—Chinese.

* cited by examiner

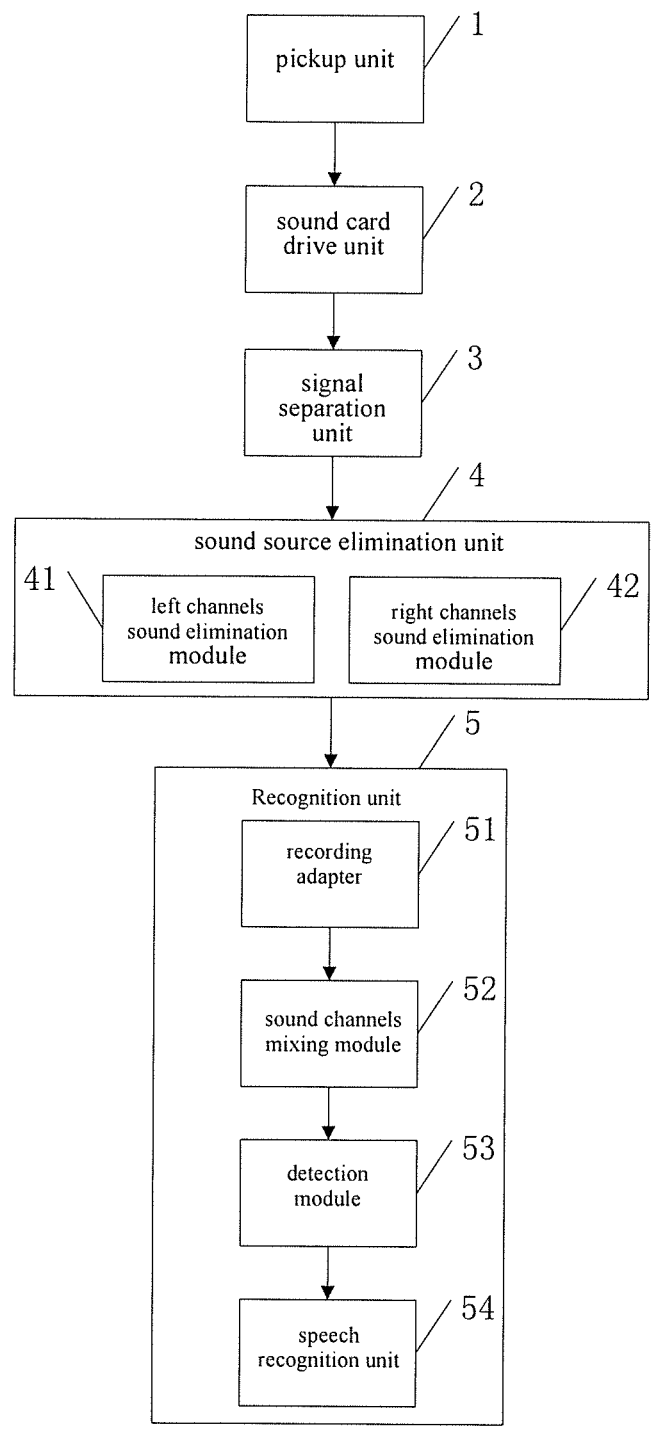

SYSTEM FOR ROBOT TO ELIMINATE OWN SOUND SOURCE

CROSS-REFERENCE TO RELATED APPLICATIONS

The present application claims priority to and the benefit of Chinese Patent Application No. CN 201510381657.1, filed on Jun. 30, 2015, the entire content of which is incorporated herein by reference.

BACKGROUND OF THE INVENTION

1. Field of the Invention

The present invention relates to the sound recognition fields, and more particularly, to a system for robot to eliminate own sound source.

2. Description of the Related Art

With the development of computer technologies, pattern recognitions and other technologies, speech recognition systems adapted to different occasions have been developed one after another. Speech recognition and processing technologies have increasingly highlighted their strong technical advantages. In recent years, speech recognition has become more and more widely used in computers, information processing, communication and electronic systems, automatic control and other fields. Since people are inevitably disturbed by the noise from the surrounding environments, the transmission mediums, the communication equipments' internal noise and other speakers' interferences in the process of speech communication, as a result, these disturbances would ultimately result in the receiver receiving the noisy speech signals rather than the pure original speech signals. In the existing robot systems, when a robot's HIFI (High-Fidelity) audio system plays music, the generated music signals would be dipped into the speech signals, which are picked up by the robot microphones, so that the speech signal-to-noise ratio entering the automatic speech recognition systems would drop, it would cause some interferences to the recognition rate of robot ASR (Automatic Speech Recognition) systems, which would decrease the recognition rate and affect the user experiences of robot speech recognition.

SUMMARY OF THE INVENTION

Given that the foregoing problems exist in the existing speech recognition and processing technologies, the present invention provides an elimination system, which is intended to offset or inhibit interference signals of music played by a robot itself, and improve the speech recognition rate of the robot.

Detailed technical solutions are as follows:

A sound source elimination system of a robot itself, comprising:

A pickup unit, for collecting digital signals mixed with left and right channels and outputting;

a sound card drive unit, connecting to said pickup unit, for mixing the received reference signals of sound source of the robot itself with the digital signals mixed with left and right channels to form mixed speech signals and outputting;

a signal separation unit, connecting to said sound card drive unit, for separating the mixed speech signals into the digital signals mixed with left and right channels and the reference signals, and judging whether interference signals existing in the digital signals mixed with left and right channels, and acquiring played semaphores and outputting;

a sound source elimination unit, connecting to said signal separation unit, for receiving reference signals, playing semaphores and digital signals mixed with left and right channels, and eliminating interference signals in the digital signals mixed with left and right channels according to the semaphores, and outputting; and a recognition unit, connecting to said sound source elimination unit, for recognizing digital signals mixed with left and right channels.

Preferably, wherein said sound source elimination unit further comprising:

a right channel sound source elimination module, for receiving reference signals, playing semaphores and digital signals mixed with left and right channels, and eliminating interference signals in the digital signals mixed with left and right channels according to the semaphores, and outputting the right channels digital signals.

Preferably, wherein said recognition unit comprising:

a recording adapter, for receiving the left channels digital signals and the right channels digital signals, and outputting.

Preferably, wherein said recognition unit further comprising:

a sound channel mixing module, connecting to said recording adapter, for mixing the left channels digital signals with the right channels digital signals to form mixed signals, and outputting.

Preferably, wherein said recognition unit further comprising:

a detection module, connecting to said sound channels mixing module, for detecting speech signals in the mixed signals, obtaining detection results, and outputting corresponding notifications according to the results.

Preferably, wherein said recognition unit further comprising:

a speech recognition unit, connecting to said detection module and said sound channel mixing module, for recognizing the mixed signals according to received notifications.

The beneficial effects of the above technical solutions are as follows:

The present invention can offset or inhibit interference signals of music played by a robot itself, provide pure speech signals for speech recognition, and improve the speech recognition rate of the robot.

BRIEF DESCRIPTIONS OF THE DRAWINGS

The accompanying drawings, together with the specification, illustrate exemplary embodiments of the present disclosure, and, together with the description, serve to explain the principles of the present invention.

FIG. 1 is a block diagram of an embodiment of a sound source elimination system of a robot itself according to the present invention.

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

As shown in FIG. 1, a sound source elimination system of a robot itself, comprising:

A pickup unit 1, for collecting digital signals mixed with left and right channels and outputting;

a sound card drive unit 2, connecting to the pickup unit 1, for mixing the received reference signals of sound source of the robot itself with the digital signals mixed with left and right channels to form mixed speech signals and outputting;

a signal separation unit 3, connecting to the sound card drive unit 2, for separating the mixed speech signals into the digital signals mixed with left and right channels and the reference signals, and judging whether interference signals existing in the digital signals mixed with left and right channels, and acquiring played semaphores and outputting;

a sound source elimination unit 4, connecting to the signal separation unit 3, for receiving reference signals, playing semaphores and digital signals mixed with left and right channels, and eliminating interference signals in the digital signals mixed with left and right channels according to the semaphores, and outputting; and a recognition unit 5, connecting to said sound source elimination unit 4, for recognizing digital signals mixed with left and right channels.

Further, a sound card drive unit 2 can be driven by a USB sound card, which is a standard USB sound card drive in the Android system devices. A pickup unit 1 may adopt a two-channel long-distance pickup microphone, which can realize the function of collecting a stereo; the pickup unit 1 can also comprise a USB and a 3.5 Line-out interface; a 3.5 Line-out interface, for collecting reference signals of left and right channel PCM (Pulse Code Modulation), and transmitting the reference signals to the Android systems in synchronization with the speech signals collected by the microphones through the USB interfaces; connecting a sound source elimination microphone of a robot itself to the robot control board through a USB interface, and accessing to Android systems based on USB sound cards; thus, transmitting the digital signals mixed with the left and right channels collected by the microphones and the reference signals of the left and right channels PCMs collected from the 3.5 Line-out interfaces to the signal separation unit 3 through the USB sound card drive. A signal separation unit 3, for separating the mixed speech signals collected by USB sound card drives into the digital signals mixed with left and right channels and the reference signals; and judging whether the system is playing music according to the digital signals mixed with left and right channels; when the systems play music, the playing semaphores are set to True, and then transmitting the playing semaphores, digital signals mixed with left and right channels and reference signals to the sound source elimination unit 4; when the systems don't play music, the playing semaphores are set to False, the system processing flow goes directly to the recognition unit 5.

In the present embodiment, adopting the sound source elimination system of a robot itself can offset or inhibit interference signals of music played by a robot itself, provide pure speech signals for speech recognition, improve the speech recognition rate of the robot and improve the users' hands-free voice recognition experiences.

In a preferred embodiment, a sound source elimination unit 4 may comprise:

a left channel sound source elimination module 41, for receiving reference signals, playing semaphores and digital signals mixed with left and right channels, and eliminating interference signals in the digital signals mixed with left and right channels according to the semaphores, and outputting the left channels digital signals.

In the present embodiment, the left channel sound source elimination module 41 realizes the interferences of the suppression system to speech recognition when playing music. The channel sound source elimination module has three input parameters: the digital signals mixed with the left and right channels collected by the microphones, the reference signals of the left and right channels PCMs of own sound source and playing semaphores. When the playing semaphores are True, the left channel sound source elimination module 41 performs its own sound source elimination to the digital signals mixed with the left and right channels collected by the microphones, the left channel sound source elimination module 41 outputs the left channel digital signals; when the playing semaphores are False, the left channel sound source eliminating module 41 is crossed, the system processing flow goes directly to the recognition unit 5.

In a preferred embodiment, a sound source elimination unit further comprises:

a right channel sound source elimination module 42, for receiving reference signals, playing semaphores and digital signals mixed with left and right channels, and eliminating interference signals in the digital signals mixed with left and right channels according to the semaphores, and outputting the right channel digital signals.

In the present embodiment, the right channel sound source elimination module 42 realizes the interferences of the suppression system to speech recognition when playing music. The right channel sound source elimination module 42 has three input parameters: the digital signals mixed with the left and right channels collected by the microphones, the reference signals of the left and right channels PCMs of own sound source and playing semaphores. When the playing semaphores are True, the right channel sound source elimination module 42 performs its own sound source elimination to the digital signals mixed with the left and right channels collected by the microphones, the right channel sound source elimination module 42 outputs the right channel digital signals; when the playing semaphores are False, the right channel sound source eliminating module 42 is crossed, the system processing flow goes directly to the recognition unit 5.

In a preferred embodiment, a recognition unit 5 may comprise:

a sound channel mixing module 52, connecting to recording adapter 51, for mixing the left channel digital signals with the right channel digital signals to form mixed signals, and outputting.

In the present embodiment, adopting the sound channel mixing module 52 can mix and output the left channel digital signals with the right channel digital signals, which are outputted by recording adapter 51.

In a preferred embodiment, a recognition unit 5 may comprise:

a detection module 53, connecting to sound channel mixing module 52, for detecting speech signals in the mixed signals, obtaining detection results, and outputting corresponding notifications according to the results.

In the present embodiment, the detection module 53 is used to detect the mixed signals, when the speech signals are detected, corresponding notifications are formed and outputted.

In a preferred embodiment, a recognition unit 5 may further comprise:

a speech recognition module 54, connecting to detection module 53 and sound channel mixing module 52, for recognizing the mixed signals according to received notifications.

In the present embodiment, when the detection module 53 detects the speech signals, corresponding notifications are formed to activate the speech recognition module 54, speech recognition is carried by speech recognition module 54.

The invention adopts the USB sound card drive to transmit the digital signals collected by microphones to the signal separation unit 3. The sound source elimination system of a robot itself can effectively offset or inhibit own sound source of music played by a robot itself. The signal separation unit 3 can separate digital signals collected by the microphones and the reference signals, and simultaneously input them to the sound source elimination unit 4 for processing; After being processed by the sound source elimination unit 4, a speech signal with a high signal-to-noise ratio is outputted, thereby the speech recognition rate is improved. The sound source elimination system of a robot itself can effectively offset or inhibit own sound source to signals from text format conversion to speech format.

The foregoing is only the preferred embodiments of the invention, not thus limiting embodiments and scope of the invention, those skilled in the art should be able to realize that the schemes obtained from the content of specification and FIGURES of the invention are within the scope of the invention.

What is claimed is:

1. A system for robot to eliminate own sound source, comprising:

a pickup unit, for collecting digital signals mixed with left and right channels and outputting;

a sound card drive unit, connecting to said pickup unit, for mixing the received reference signals of sound source of the robot itself with the digital signals mixed with left and right channels to form mixed speech signals and outputting;

a signal separation unit, connecting to said sound card drive unit, for separating the mixed speech signals into the digital signals mixed with left and right channels and the reference signals, and judging whether interference signals existing in the digital signals mixed with left and right channels, and acquiring playing semaphores and outputting the digital signals mixed with left and right channels and the reference signals and the playing semaphores; when the system plays music, the playing semaphores are set to True, when the systems don't play music, the playing semaphores are set to False;

a sound source elimination unit, connecting to said signal separation unit, for receiving reference signals, playing semaphores and digital signals mixed with left and right channels, and eliminating interference signals in the digital signals mixed with left and right channels according to the semaphores, and outputting; and a recognition unit, connecting to said sound source elimination unit, for recognizing digital signals mixed with left and right channels.

2. The system for robot to eliminate own sound source of claim 1, wherein said sound source elimination unit further comprising:

a left channels sound source elimination module, for receiving reference signals, playing semaphores and digital signals mixed with left and right channels, and eliminating interference signals in the digital signals mixed with left and right channels according to the semaphores when the playing semaphores are True, and outputting the left channels digital signals.

3. The system for robot to eliminate own sound source of claim 2, wherein said sound source elimination unit further comprising:

a right channels sound source elimination module, for receiving reference signals, playing semaphores and digital signals mixed with left and right channels, and eliminating interference signals in the digital signals mixed with left and right channels according to the semaphores when the playing semaphores are True, and outputting the right channels digital signals.

4. The system for robot to eliminate own sound source of claim 3, wherein: said recognition unit further comprising:

a recording adapter, for receiving the left channels digital signals and the right channels digital signals, and outputting the left channels digital signals and the right channels digital signals.

5. The system for robot to eliminate own sound source of claim 4, wherein said recognition unit further comprising: a sound channels mixing module, connecting to said recording adapter, for mixing the left channels digital signals with the right channels digital signals to form mixed signals, and outputting the mixed signals.

6. The system for robot to eliminate own sound source of claim 5, wherein: said recognition unit further comprising:

a detection module, connecting to said sound channels mixing module, for detecting speech signals in the mixed signals, obtaining detection results, and outputting corresponding notifications according to the results.

7. The system for robot to eliminate own sound source of claim 6, wherein: said recognition unit further comprising:
   a speech recognition unit, connecting to said detection module and said sound channel mixing module, for recognizing the mixed signals according to received notifications.

\* \* \* \* \*